United States Patent
Jacob, IV et al.

(10) Patent No.: US 7,157,005 B2
(45) Date of Patent: Jan. 2, 2007

(54) REGENERANT REUSE

(75) Inventors: William A. Jacob, IV, Jerome, ID (US); Lawrence Velasquez, Twin Falls, ID (US)

(73) Assignee: Amalgamated Research, Inc., Twin Falls, ID (US)

( * ) Notice: Subject to any disclaimer, the term of this patent is extended or adjusted under 35 U.S.C. 154(b) by 33 days.

(21) Appl. No.: 10/841,936

(22) Filed: May 7, 2004

(65) Prior Publication Data

US 2005/0051491 A1    Mar. 10, 2005

Related U.S. Application Data

(60) Provisional application No. 60/469,615, filed on May 8, 2003.

(51) Int. Cl.
*B01J 49/00* (2006.01)

(52) U.S. Cl. .................. 210/670; 210/687

(58) Field of Classification Search ............ 210/670, 210/687
See application file for complete search history.

(56) References Cited

U.S. PATENT DOCUMENTS

| | | | | |
|---|---|---|---|---|
| 4,207,397 | A | * | 6/1980 | Davis et al. .................. 521/26 |
| 6,776,913 | B1 | * | 8/2004 | Jangbarwala ............... 210/677 |
| 2005/0238733 | A1 | * | 10/2005 | Henry ......................... 424/717 |

* cited by examiner

*Primary Examiner*—Chester T Barry
(74) *Attorney, Agent, or Firm*—TraskBritt, P.C.

(57) ABSTRACT

The invention provides a method for recycling the waste regenerant from softeners. The method includes passing a high concentration of monovalent ionic halide salt through a resin bed. The high monovalent cation concentration causes the divalent cations on the resin to be exchanged with the monovalent cations by osmotic forces. The regenerant is then treated to precipitate the divalent cations and replace them with monovalent cations.

6 Claims, 1 Drawing Sheet

REGENERANT REUSE

PRIORITY CLAIM

This application claims the benefit of the filing date of U.S. Provisional Patent Application Ser. No. 60/469,615, filed May 8, 2003, for "REGENERANT REUSE".

TECHNICAL FIELD

Field of the Invention: The invention relates to ion exchange processes. More specifically, the invention is directed to the softening of liquid streams and the regenerant waste streams produced.

BACKGROUND

State of the Art: Many liquid streams benefit from softening. Softening is used in many forms in industry, but serious environmental problems arise from the regenerant waste stream disposal. Recycling some of the components of the regenerant stream greatly reduces the risk of environmental problems associated with disposal. Additionally, the new waste product may have the potential for further use in industry. Historically, there has been little need for recycling the regenerant. Recent environmental regulations have made this process necessary in salt regenerated softening systems.

DISCLOSURE OF INVENTION

The invention provides a method for recycling the waste regenerant from softeners. More specifically, softeners using an ionic halide salt as a regenerant. The softening process exchanges divalent cations, such as calcium and magnesium, with a monovalent cation, such as sodium or potassium. This process is achieved using an ion exchange resin with a higher affinity for divalent cations than monovalent cations. Regeneration of the ion exchange resin is achieved by passing a high concentration of monovalent ionic halide salt through the resin bed. The higher monovalent cation concentration causes the divalent cations on the resin to be exchanged with the monovalent cations by osmotic forces. The waste regenerant stream then contains a high level of divalent cations with a high level of monovalent cations. Also in this stream is the halide anion. Since the halide anion is the environmentally problematic ion, it would be beneficial to recycle these anions. The waste regenerant stream is treated to precipitate the divalent cations, and replace them with the same monovalent cation as the initial regenerant. The treated waste regenerant stream is then filtered to remove the precipitated divalent ions, and is recycled back for further regenerations. This process creates a solid waste environmentally safe for disposal, or for use in other industrial processes. This process is unique for the sucrose industry due to the very large regenerant waste streams that are generated. Environmental problems associated with regenerant waste have been the major drawback for industrial installations worldwide. This invention allows softening to be economically and environmentally sound on a the very large scale of the sucrose industry.

BRIEF DESCRIPTION OF DRAWING

In the drawing, which illustrates what is currently considered to be the best mode for carrying out the invention.

BEST MODE(S) FOR CARRYING OUT THE INVENTION

Figure 1:
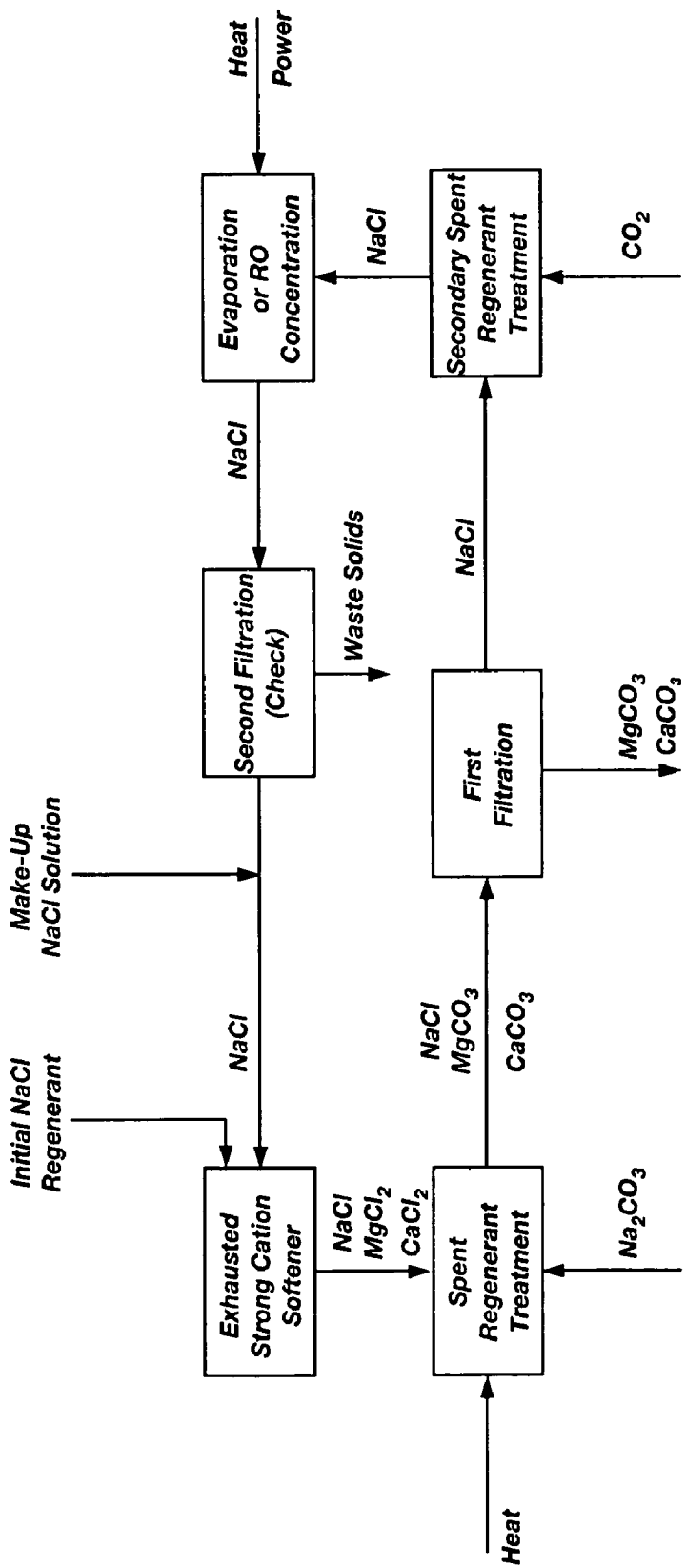
FIG. 1 illustrates the method for recycling the waste regenerant from softeners.

Liquid streams containing quantities of divalent cations are passed through a column containing an ion exchange resin. The ion exchange resin must have a higher affinity for divalent cations than monovalent cations. One example of this type of resin would be a macroporous polystyrene resin with an active sulfonic group, cross-linked with divinyl benzene. This example resin is known as a "strong cation" resin. When the sucrose stream is passed through the ion exchange resin, an equivalent amount of divalent cation is exchanged for a equivalent amount of monovalent cation. For example, one equivalent of calcium is exchanged for one equivalent of sodium. At the point where all or most of the active sites for exchange contain a divalent cation, the resin is considered exhausted or saturated. The ion exchange resin must be regenerated with monovalent cations before it may be used again to remove divalent cations from the sucrose stream. This technology is used extensively in the water softening industry.

Referring to FIG. 1, regeneration of the resin is performed by passing a high concentration of monovalent cation through the exhausted column. The regenerant must contain a monovalent cation and a halide anion. One example of this type of regenerant would be sodium chloride. The level of monovalent cation must be of a sufficiently high enough concentration to osmotically force the divalent cation off the resin and replace it with the monovalent cation. This level should be 80% to 1000% on equivalents of divalent cations contained in the ion exchange resin, and the concentration must be between 0.5 and 10 Normal. Varying the concentration and monovalent cation facilitates the ability to vary the level of completion of regeneration. The resultant spent regenerant will have a high content of divalent cations, but the halide anion content will not change.

The spent regenerant is now treated with an alkaline solution to initiate a precipitation of the divalent cation, and replace it with a monovalent cation. An example of this would be if the ion exchange resin was regenerated with sodium chloride, and the spent regenerant contained mostly calcium chloride. The calcium is precipitated by the addition of sodium carbonate forming calcium carbonate.

At least one equivalent of alkaline solution is necessary for this regenerant recycle reuse process to work. Higher equivalents of alkaline solution can be used to facilitate the reaction. Carbon dioxide is then introduced to the spent regenerant to neutralize the excess or unreacted sodium carbonate. The target pH should be between 6 and 8 pH. The carbon dioxide forms a weak acid, carbonic acid, for this reaction to occur. This addition of the carbon dioxide is important to the invention. This addition removes the excess sodium carbonate as well as excess divalent cations. The addition of the carbon dioxide also prevents a buildup of recycled anions that would occur if other acids were used for neutralization, such as hydrochloric acid.

When the calcium carbonate is removed, the resulting solution contains mostly sodium chloride, which can be used to regenerate the ion exchange resin again.

In the example (FIG. 1), a concentration stage is shown after pH adjustment is made to the process. This is necessary only if dilution occurs during the first and last parts of the regenerant cycle. Also in the examples, a secondary filtration is displayed as a preventative measure to remove any post or secondary precipitation that may occur. These may be due to short retention times during the alkaline reaction, or precipitates that may form due to concentration of the treated spent regenerant.

Testing this process revealed the regenerant could be recycled indefinitely. Some losses are expected due to the filtration process, and these can be made up with fresh regenerant, or for example, a high salt content spent regenerant waste from a decolorization process.

An example of the operation could include the waste regenerant streams from a strong cation softener with a weak cation softener as a polishing unit. The strong cation softener would operate as stated above. The weak cation softener would use Hydrochloric acid as a regenerant and this waste regenerant stream would be added into the recycle process. The size of the weak cation softener system could not have a capacity greater than the purge. This waste regenerant stream would take the place of any make up stream needed to replace the purge volume lost. If it were larger, a chloride build up may occur.

What is claimed is:

1. A method for recycling waste regenerant from a softening procedure, said method comprising:
   providing a waste regenerant stream having monovalent cations and halide anions;
   providing a column containing an ion exchange resin which is saturated with divalent cations;
   passing said regenerant stream through said column in a sufficiently high concentration to osmotically force the divalent cations off the resin and replace said divalent cations with said monovalent cations;
   treating said regenerant with an alkaline solution to initiate a precipitation of the divalent cations and a replacement of said divalent cations with said monovalent cations; and
   introducing carbon dioxide to the regenerant to neutralize any unreacted alkaline solution.

2. The method of claim 1 wherein said regenerant is treated with a quantity of said alkaline solution sufficient to produce a pH of between about 6 and about 8.

3. The method of claim 1 wherein said regenerant is treated with at least one equivalent of alkaline solution.

4. The method of claim 1 further including the step of concentrating said regenerant after said treating of said regenerant.

5. The method of claim 1 wherein said concentration of regenerant is between 80 percent and 1000 percent of equivalents of divalent cations contained in the ion exchange resin.

6. The method of claim 1 wherein said concentration of regenerant is between 0.5 and 10 Normal.

* * * * *